US012803791B2

(12) United States Patent
Li et al.

(10) Patent No.: US 12,803,791 B2
(45) Date of Patent: Nov. 17, 2026

(54) METHOD FOR PROTECTING MODULAR EXPONENTIAL ALGORITHMS AGAINST DEEP-LEARNING SIDE-CHANNEL ATTACK (DL-SCA)

(71) Applicant: THALES DIS FRANCE SAS, Meudon (FR)

(72) Inventors: Xun Li, Paris (FR); David Vigilant, Angers (FR)

(73) Assignee: THALES DIS FRANCE SAS, Meudon (FR)

( * ) Notice: Subject to any disclaimer, the term of this patent is extended or adjusted under 35 U.S.C. 154(b) by 136 days.

(21) Appl. No.: 18/844,479

(22) PCT Filed: Mar. 10, 2023

(86) PCT No.: PCT/EP2023/056248
§ 371 (c)(1),
(2) Date: Sep. 6, 2024

(87) PCT Pub. No.: WO2023/170305
PCT Pub. Date: Sep. 14, 2023

(65) Prior Publication Data
US 2025/0233732 A1 Jul. 17, 2025

(30) Foreign Application Priority Data
Mar. 11, 2022 (EP) .................................... 22305274

(51) Int. Cl.
*H04L 9/08* (2006.01)
*H04L 9/00* (2022.01)
*H04L 9/30* (2006.01)

(52) U.S. Cl.
CPC ............ *H04L 9/0825* (2013.01); *H04L 9/003* (2013.01); *H04L 9/0869* (2013.01); *H04L 9/302* (2013.01)

(58) Field of Classification Search
CPC ..... H04L 9/0825; H04L 9/003; H04L 9/0869; H04L 9/302; H04L 2209/08; H04L 9/3066
See application file for complete search history.

(56) References Cited

U.S. PATENT DOCUMENTS

2011/0007894 A1* 1/2011 Takenaka ................ G06F 7/723 380/28
2017/0187529 A1* 6/2017 Guilley ..................... H04L 9/14

FOREIGN PATENT DOCUMENTS

CN 107508678 B * 8/2020 ............ H04L 9/003

OTHER PUBLICATIONS

Sonia Belaid et al: "High Order Countermeasures for Elliptic-Curve Implementations with Noisy LeakageSecurity", IACR, International Association for Cryptologic Research, vol. 20211203:0758442 Dec. 2021 (Dec. 2, 2021), pp. 1-44 (Year: 2021).*

(Continued)

*Primary Examiner* — Henry Tsang

(57) ABSTRACT

A method for countering a profiling of deep-learning side channel (SCA) algorithm to disrupt a training phase of a deep-learning model is provided. It alters and interleaves an execution sequence of modular exponentiations or point additions in a counter SCA algorithm. The mixing, loops through bits of a private key, D, along a sliding window, wherein for each loop, an N-bit tuple from the private key is compared to the random number plus a linear increment, and, if the value is a match, it indexes into said precomputed vector according to said random number, r, thereby extracting and interleaving values into an execution path of said counter SCA algorithm from said precomputed vector according to an index represented by said random number; otherwise. Other embodiments are provided.

15 Claims, 15 Drawing Sheets

(56) References Cited

OTHER PUBLICATIONS

Mathieu Carbone et al: “Deep Learning to Evaluate Secure RSA Implementations”, IACR, International Association for Cryptologic Research, vol. 20190125:204051, Jan. 21, 2019 (Jan. 21, 2019), pp. 1-30 (Year: 2019).*

International Search Report (PCT/ISA/210) and Written Opinion (PCT/ISA/237) mailed on Apr. 19, 2023, by the European Patent Office as the International Searching Authority for current International Application No. PCT/US2023/056248—[17 pages].

Barenghi Alessandro et al: “Profiled Attacks Against the Elliptic Curve Scalar Point Multiplication Using Neural Networks”, Jan. 1, 2022 (Jan. 1, 2022), Pattern Recognition: 5th Asian Conference, ACPR 2019, Auckland, New Zealand, Nov. 26-29, 2019, Revised Selected Papers, Part II; [Lecture Notes in Computer Science], Springer International Publishing, Cham, pp. 238-257, XP047618060, ISSN: 0302-9743, ISBN: 978-3-030-41298-2, [retrieved on Jan. 1, 2022], Algorithm 3, section 6.

Sonia Belaid et al: “High Order Countermeasures for Elliptic-Curve Implementations with Noisy Leakage Security”, IACR, International Association for Cryptologic Research, vol. 20211203:075844 Dec. 2, 2021 (Dec. 2, 2021), pp. 1-44, XP061069443, Retrieved from the Internet: URL:https://eprint.iacr.org/2021/1580.pdf, [retrieved on Dec. 2, 2021], the whole document.

Ruizhe Gu et al: “Adversarial Attack Based Countermeasures against Deep Learning Side-Channel Attacks”, arxiv.org, Cornell University Library, 201 Olin Library Cornell University Ithaca, NY 14853, Sep. 22, 2020 (Sep. 22, 2020), XP081768714, the whole document.

Mathieu Carbone et al: “Deep Learning to Evaluate Secure RSA Implementations”, IACR, International Association for Cryptologic Research, vol. 20190125:204051, Jan. 21, 2019 (Jan. 21, 2019), pp. 1-30, XP061027528, Retrieved from the Internet: URL:http://eprint.iacr.org/2019/054.pdf; [retrieved on Jan. 21, 2019] the whole document.

* cited by examiner

Implementation A

Window-Bit-Level mixing with traditional algorithm

```
     1.  Algo_A_DL_Safe(M, D, P) :
202  2.     For i = 0 to 2^N − 3:
203  3.        M[i] = M^(i+2) mod P → skip the value 0 and 1
204  4.     r = RNG(N) → pick a random in [0, 2^N − 3]
205  5.     initialization for Algo_A
206  6.     For each N − bits of D (MSB to LSB) :          Loop
207  7.        If N − bits value == (r + 2):
208  8.           Algo_window_process with M[r]
209  9.        Else:
210  10.          Algo_A_process as normal
     11.    return result
```

216

FIG. 2A

Window-Bit-Level mixing
with traditional algorithm
N=3

Step 1

Bit sequence of private key D 100111101 (Loop1: 100, Loop2: 111, Loop3: 101)

$r = 2^N - 3$ $r = 0,1,2,3,4$ or $5$

Step 2

| r | r bits value | r+2 bits value | Algo | value |
|---|---|---|---|---|
| 0 | 000 | 010 | **AWP** | $M^2$ |
| 1 | 001 | 011 | **AWP** | $M^3$ |
| 2 | 010 | 100 | **AWP** | $M^4$ |
| 3 | 011 | 101 | **AWP** | $M^5$ |
| 4 | 100 | 110 | **AWP** | $M^6$ |
| 5 | 101 | 111 | **AWP** | $M^7$ |

Step 3

| Loop # | N-bits of D | (r+2)==2 | (r+2)==3 | (r+2)==4 | (r+2)==5 | (r+2)==6 | (r+2)==7 |
|---|---|---|---|---|---|---|---|
| Loop1 | 100 | AAP | AAP | **AWP** | AAP | AAP | AAP |
| Loop2 | 111 | AAP | AAP | AAP | AAP | AAP | **AWP** |
| Loop3 | 101 | AAP | AAP | AAP | **AWP** | AAP | AAP |

360

400

| | Loop 1 | Loop 2 | Loop 3 | Loop 4 |
|---|---|---|---|---|
| **SAMA** | S-M-S-Mf | S-Mf-S-M | S-M-S-M | S-M-S-Mf |
| **Link to bit** | 1 0 | 0 1 | 1 1 | 1 0 |
| **SAMA DL_Safe (r+2=2)** | S-Mf-S-Mr | S-Mf-S-M | S-M-S-M | S-Mf-S-Mr |
| **Link to bit** | x 10 | 0 1 | 1 1 | x 10 |
| **SAMA DL_Safe (r+2=3)** | S-M-S-Mf | S-Mf-S-M | S-Mf-S-Mr | S-M-S-Mf |
| **Link to bit** | 1 0 | 0 1 | x 11 | 1 0 |

AWP (thick-bordered box)

AAP (thin-bordered box)

450

FIG. 4B

| Loop | 1,2 | 3,4 | 5,6 | 7,8 |
|---|---|---|---|---|
| ATOMIC | S-M-S | S-S-M | S-M-S-M | S-M-S |
| Link to bit | 1 0 | 0 1 | 1 1 | 1 0 |
| ATOMIC DL_Safe (r+2=2) | S-S-M[r] | S-S-M | S-M-S-M | S-S-M[r] |
| Link to bit | x 10 | 0 1 | 1 1 | x 10 |
| ATOMIC DL_Safe (r+2=3) | S-M-S | S-S-M | S-S-M[r] | S-M-S |
| Link to bit | 1 0 | 0 1 | x 11 | 1 0 |

AWP

AAP

550

FIG. 5B

| Loop | 1,2 | 3,4 | 5,6 | 7,8 |
|---|---|---|---|---|
| ML | M-S-M-S | M-S-M-S | M-S-M-S | M-S-M-S |
| Link to bit | 1 0 | 0 1 | 1 1 | 1 0 |
| ATOMIC DL_Safe (r+2=2) | S-S-M[r]-M | M-S-M-S | M-S-M-S | S-S-M[r]-M |
| Link to bit | x 10 | 0 1 | 1 1 | x 10 |
| ATOMIC DL_Safe (r+2=3) | M-S-M-S | M-S-M-S | S-S-M[r]-M | M-S-M-S |
| Link to bit | 1 0 | 0 1 | x 11 | 1 0 |

AWP

AAP

650

FIG. 6B

METHOD FOR PROTECTING MODULAR EXPONENTIAL ALGORITHMS AGAINST DEEP-LEARNING SIDE-CHANNEL ATTACK (DL-SCA)

TECHNICAL FIELD

The present invention relates to the technical field of cryptography, cryptographic processing attacks, and side channel attack (SCA) mitigations. More particularly, embodiments relate to methods for altering counter side-channel attack algorithms in a way to mitigate profiling by deep-learning machines.

It also relates to a new and developed way to cryptographically protect products processing a public key cryptographic algorithm for signature/verification, encryption/decryption, key exchange, and key encapsulation, which are sensitive to side-channel attack.

More specifically, it envisages a means of cryptographic processing at the algorithm level to protect profiling of secure computations, for example, a smart card or a secure element implementing RSA signature/verification using modular exponential algorithms and ECC signature/verification using point multiplication algorithms.

Advantageously, the invention provides a technical mechanism for protecting core cryptographic algorithms against profiling by deep-learning side-channel attack.

BACKGROUND

In order to build a secure cryptosystem, the key and encryption algorithm used should be strong. Understandably, the key should be secret, and the implementation of the cryptosystem should be strong to hide the key and avoid information leakage leading to reveal this secret key. However, cyberattacks are now a common and repeating occurrence. One of these attacks is the Side Channel Attacks (SCA), which is capable of revealing the secret key based on investigating the leaked side channel information such as consumed energy and execution time in cryptosystems.

A side-channel attack monitors security critical operations, and is an attack that exploits physical leakages from a cryptographic device rather than the weakness in the algorithm itself. Timing information, power consumption, heat, acoustics and electromagnetic leaks can provide an extra source of information, which can be exploited to learn cryptographic information. Side-channel leakages from a physical device may be exploited to recover a secret of block ciphers, digital signatures, secret keys and post-quantum cryptography. Today, side-channel attack is considered one of the most practical attacks, and is currently considered a de-facto standard for implementing cryptographic algorithms.

In view of the limitations above, the invention herein provides a technical mechanism by way of algorithm modifications for protecting core modular exponential algorithms against profiling by deep-learning side-channel attack.

SUMMARY

In a first embodiment, a method (216) is provided for protecting modular exponential and point addition algorithms executing on a device (101) against profiling from a deep-learning (100) side-channel attack. It includes the steps of mixing (206) a windowing process (160) with a counter side-channel-attack (SCA) algorithm (140) according to a random number (204), r, generated during execution of said counter SCA algorithm; whereby, values selected from a precomputed vector (203) are interleaved (209) into said counter SCA algorithm according to the random number, r, wherein values from said precomputed vector are indexed by r (204). This preemptively introduces future errors in a deep-learning (100) labeling process (111) of operation sequences (109) of said counter SCA algorithm to bit values (112) of a private key (102) used during said execution of said counter SCA algorithm.

In a first configuration, for RSA, the precomputed vector (203) is a precomputed multiplication vector M representing an operation sequence (163) of modular exponentiations for RSA, wherein M[r] represents indexing by r. Initialization includes establishing (202) a bit-length, N, of a window, where N is the number of bits in the window; and precomputing (203) said multiplication vector, M, with a length of $2^N-3$, having index, i, values $M[i]=M^{i+2}$ mod P for i=0 to $2^N-3$. The modular exponentiations perform M raised to the power D modulo P via said operation sequences, where a message is M, modular is P, and said private key is D. In a second configuration, for ECC, the precomputed vector (203) is a precomputed addition vector A representing an operation sequence (163) of point additions for ECC, wherein A[r] represents indexing by r.

The mixing is achieved via non-overlapping windowing and includes looping (206) through bits of said private key, D, according to a sliding window, wherein for each loop, an N-bit tuple from the private key is produced from the sliding window, wherein for each loop, it includes comparing (207) a value of the N-bit tuple to the random number plus a linear increment. If the value is a match, it indexs (208) into said precomputed vector according to said random number, r, thereby extracting and interleaving values into an execution path of said counter SCA algorithm from said precomputed vector according to an index represented by said random number. Otherwise, if the value is not a match, it executes (210) said counter SCA algorithm as normal, thereby not interleaving precomputed values into the execution path of said counter SCA algorithm. The sliding window of the looping proceeds in a direction of most significant bit (MSB) to least significant bit (LSB), or in a direction of LSB to MSB, for bits of said private key, D. The random number, r, is generated once (204) during initialization steps prior to a looping (206), wherein said mixing the windowing process is performed on a bit-by-bit basis of the N-tuple, to provide a window bit-level mixing (209) with said counter SCA algorithm. The random number, r, is generated during (226) said lopping for each said loop (225), wherein said mixing the windowing process is performed on a bit-by-bit basis of the N-tuple, to provide a window bit-level mixing (229) with said counter SCA algorithm.

In a second embodiment, a device is provided to implement window-bit-level mixing to protect modular exponential and point multiplication (and addition) algorithms against profiling from a deep-learning (100) side-channel attack. The device (101) can be one among a processor, a crypto-processor, a smart-card, and a secure element, implementing counter SCA cryptographic algorithms. By way of the device implementing computer program code with instructions executed on a processor for performing the method steps of Window-Bit-Level mixing with a traditional algorithm (e.g. SCA), it can mitigate (107) timing attacks, power-monitoring attack, electromagnetic attack, Public Key cryptography (PKI) attacks, and differential power analysis attack The windowing process for an RSA modular exponentiation is applied to a "Square and Multiply always" (SAMA)

SCA algorithm (400) adapted to interleave multiplication operators—extracted from said precomputed multiplication vector—during said RSA modular exponentiation. The windowing process for RSA modular exponentiation is applied to an ATOMIC SCA algorithm (500), and preserves a relationship between registers containing the operators for said operation such that randomization of the random number, r, ensures an operation sequence of the SCA algorithm using an M[r] from said precomputed multiplication vector is always different. The windowing process for RSA modular exponentiation can be applied to a Montgomery Ladder (ML) SCA algorithm (600) to preserve a relationship between registers containing the operators for said operation such that randomization of the random number, r, ensures an operation sequence of the SCA algorithm using an M[r] from said precomputed multiplication vector is always different.

The windowing process for an ECC point multiplication is applied to a "Double and Add always" (DaAA) SCA algorithm adapted to interleave ECC addition operators—extracted from a precomputed addition vector—during said ECC point multiplication. The windowing process for ECC point multiplication is applied to an ATOMIC SCA algorithm, and preserves a relationship between registers containing the operators for said operation such that randomization of the random number, r, ensures an operation sequence of the SCA algorithm using an A[r] from a precomputed addition vector is always different. The windowing process for ECC point multiplication can be applied to a Montgomery Ladder (ML) SCA algorithm, to preserve a relationship between registers containing the operators for said operation such that randomization of the random number, r, ensures an operation sequence of the SCA algorithm using an A[r] from a precomputed addition vector is always different.

In a third embodiment, a method (220) for countering a profiling of deep-learning (100) side channel (SCA) algorithm to disrupt a training phase of a deep-learning model is provided. The method can be performed on the device above. The method steps include altering an execution sequence (163) of modular exponentiations or point additions in a counter SCA algorithm, characterized in that, by: establishing (202) a bit-length, N, of a non-overlapping sliding window, where N is the number of bits in the window; generating (203) a precomputation vector of precomuted modular exponentiations or point additions; selecting (204) a random number, r, using said bit-length, N; and looping (206-210) through bits of a private key, D, that is subject of the SCA algorithm attack, according to said sliding window, wherein for each loop, an N-bit tuple from the private key (102) is produced from the sliding window. For each loop, the method comprises comparing (207) a value of the N-bit tuple to the random number plus a linear increment and, if the value is a match, indexing (208) into said precomputed vector according to said random number, r, thereby extracting and interleaving values into an execution path of said counter SCA algorithm from said precomputed vector according to an index represented by said random number; otherwise, if the value is not a match, executing (209) said counter SCA algorithm as normal, thereby not interleaving precomputed values into the execution path of said counter SCA algorithm, wherein the sliding window of the looping proceeds in a direction of most significant bit (MSB) to least significant bit (LSB), or in a direction of LSB to MSB, for bits of said private key, D, whereby the randomizing preemptively introduces future faults in a deep-learning labeling process of operation sequences to bit values, and wherein values selected from said precomputed vector are interleaved into said counter SCA algorithm according to the random number, r.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

FIG. 2A depicts a first implementation of pseudo-code for window-bit-level mixing with a Side Channel Attack (SCA) algorithm in accordance with an embodiment;

FIG. 4B shows a specific link-to-bit mapping of the first SCA algorithm of FIG. 4A in accordance with an embodiment;

FIG. 5B shows a specific link-to-bit mapping of the second SCA algorithm of FIG. 5A in accordance with an embodiment;

FIG. 6B shows a specific link-to-bit mapping of the third SCA algorithm of FIG. 6A in accordance with an embodiment;

DETAILED DESCRIPTION

Figure 1A:
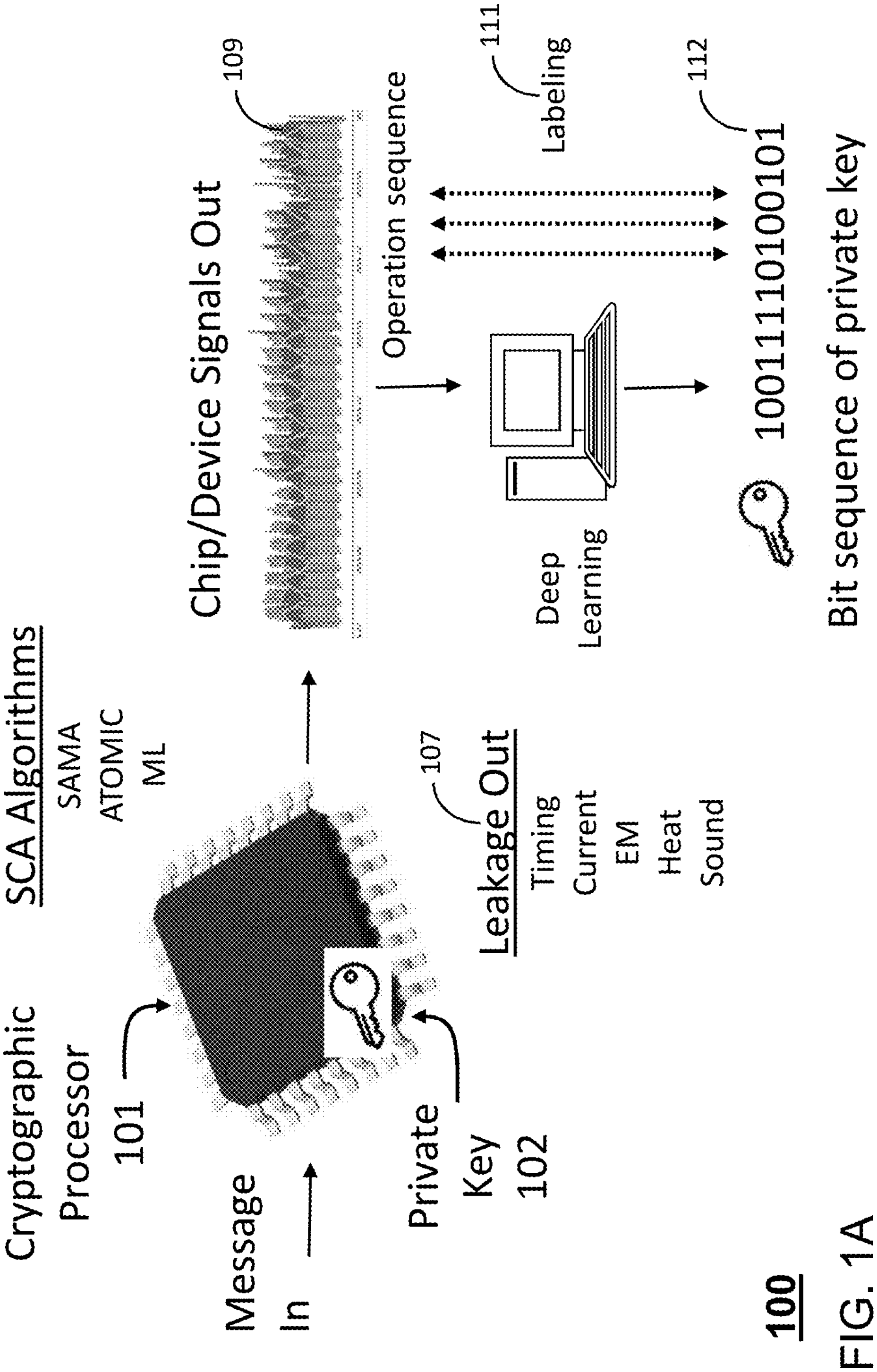
FIG. 1A depicts an illustration of a deep-learning system used in side channel attack on a cryptographic processor.

While the specification concludes with claims defining the features of the invention that are regarded as novel, it is believed that the invention will be better understood from a consideration of the following description in conjunction with the drawing figures.

FIG. 1A depicts an exemplary illustration of a deep-learning system 100 used for side channel attack (SCA) against a cryptographic processor 101. As shown, the processor 101 receives in data or messages that are cryptographically processed, and in some form or another, rely on a secret, such as, a private key 102. As shown, at the bit-level, the private key, or other secret, is a bit sequence of ones (1) and zeros (0). A side-channel attack (SCA) is a security exploit that attempts to extract the private key 102 through analysis of leaked information by the cryptographic processor 101. This can be achieved, for example, by the deep learning machine, measurement and analysis on various physical parameters, such as, timing, current, electromagnetic emissions, heat, or sound emanating from the cryptographic processor 102. These types of attacks pose a serious threat to modules that integrate cryptographic systems. Although many side-channel analysis techniques have proven successful in breaking an algorithmically robust cryptographic operation and extracting the secret key, deep learning systems pose new abilities and concerns.

A deep learning side-channel attack (DL-SCA) is a new form of a profiling side-channel attack method that uses a machine-intelligence system's statistical learning abilities to reveal a cryptographic module's secret key from such side-channel information. A deep learning machine can learn a mapping between leaked information and the individual bits of the private key, in what is called "labeling". As an example of a DL-SCA, a neural network can be trained from the output of differential power and timing signals captured from a target cryptographic module, or cryptographic processor 101. The trained neural network extracts relevant hardware processing information (e.g. transistor state changes, gate switching, logic operations, etc.) and external information (e.g. electrical signals, EM signals/waveforms, etc.) from the leaky part that depends on the private key 102.

DL-SCA's can also exploit algorithm specific implementation details (whether in software, hardware, or combination thereof) to gain knowledge about the private key 102, such as the time the algorithm (at the high-level software operating-system level, or the low-level gate logic) takes to execute the computation. For instance, the time duration taken by the known square-and-multiply algorithm used in classical implementation of the modular exponentiation depends linearly on the number of bits in the key. This linear relation can be exploited by an attacker, to infer the number of bits in the key by timing how long it takes to perform the computation for diverse RSA keys. That is, it can link an operation sequence of machine instructions, for instance, add and multiply operations of an SCA algorithm, to bits in the private key 102 during its access and use by the cryptographic processor 101, to label operations sequences to bit values of the private key, thereby compromising the security of the system.

Software, firmware, or embedded code is the general category of code which runs on the hardware. The central processing unit (CPU) of the cryptographic processor 102 understands a low level machine code language known as native code. The language of the machine code is hardwired into the design of the CPU hardware. The CPU runs instructions using a "fetch-execute" cycle; that is, the CPU gets the first instruction in the sequence, executes it, and then fetches the next instruction and executes it, and so on. Some of the instructions affect the order that the CPU takes through the instruction (operational) sequence. For instance, an instruction might direct the CPU to jump back to an earlier point in the instruction sequence (loops are implemented this way), or to skip over the next instruction if a particular condition is met.

Figure 1B:
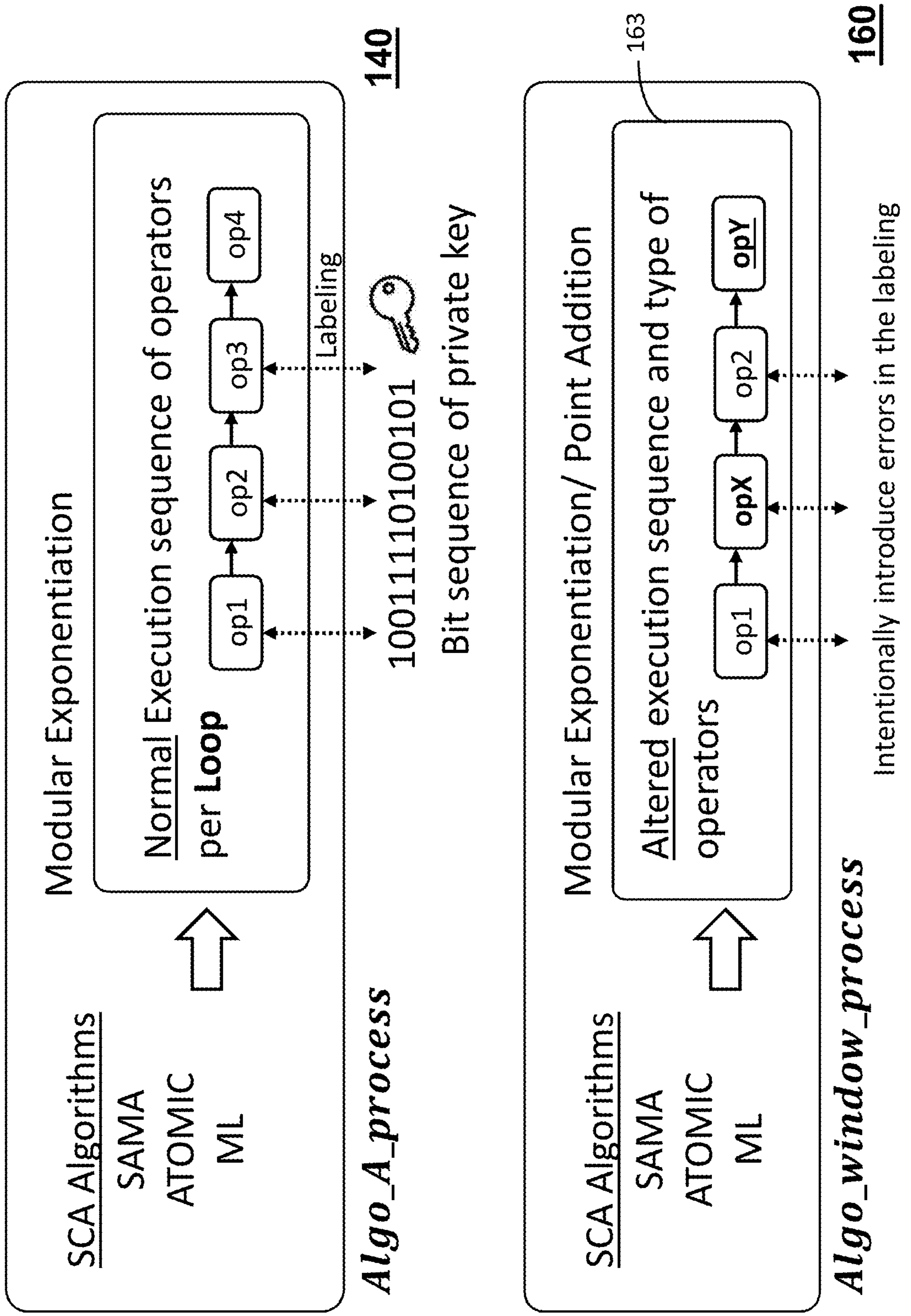
FIG. 1B illustrates a high-level representation for altering an execution sequence of operators used in a cryptographic processor in accordance with an embodiment.

FIG. 1B illustrates a high-level representation for altering an execution sequence of operators used by an SCA algorithm in a cryptographic processor in accordance with an embodiment. An operation is considered any operation of the cryptographic processor 101 during its cryptographic performance. An operation may be a mathematical operation such as an add, subtract, multiply, divide, modulo, or a logical or functional operation, such as a shift, move, round, memory access, fetch, execute, or so on. It may occur at the programming language level, the firmware level, embedded, assembly, or hard-ware level (e.g., gates, transistors, etc.).

Most embedded devices implementing public key cryptography use RSA for encryption and signature schemes, or cryptographic primitives over a Field of Primes (Fp) such as DSA and the Diffie-Hellman key agreement protocol. There are many examples on the symmetric encryption algorithms such as DES, Blowfish, and Advanced Encryption Standard (AES) which is among the most known symmetric encryption algorithms and it is used worldwide to protect sensitive data in many cryptocurrency and government applications. In the same context, the Elliptic Curve Cryptography (ECC) and RSA are considered the most common Asymmetric encryption algorithms used nowadays. All these algorithms require the computation of modular exponentiations or ECC point additions/multiplications in some form of another.

An exponentiation is basically a sequence of multiplications and squarings, but depending on how an algorithm is implemented, this sequence may either reveal, or successfully hide, exponent bits to an attacker on an unprotected implementation as explained above. The methods contemplated herein mitigate attacks directed at distinguishing multiplications and squarings in a modular exponentiation algorithm. Examples of side channel algorithms are the square and multiply always (SAMA), the atomic square and multiply algorithm (ATOMIC), and Montgomery Ladder (ML) algorithms.

Problem

In public key infrastructure (PKI) cryptography, the algorithm of modular exponential is the core algorithm needs to be protected against side-channel attack because it will process the private key bit by bit, any leakage will cause private key disclosed. Traditional attacks based on TA (Template Attack) assume a multivariable Gaussian distribution of the underlying noise and cryptographic processor leakage. But today, the deep-learning has been used more and more often as the state-of-art method for attacking which makes no assumption of the underline distribution. The usage of DL-SCA has gained more success with public key than symmetric key cryptography compared to traditional attacks like TA or CPA because each private key bit manipulation needs more time to process by the CPU and/or Coprocessor (dedicated for big number modular operations, but without much protection). Modular exponential algorithms said to be secure for SCA are not secure enough for DL-SCA. Traditional counter measures like jitter, random delay, hamming weight equality, and address randomization as some examples have proven not strong enough against DL-SCA.

Recall, that the problem with deep learning attacks is that they are more and more popular and powerful than template attacks. This is especially true for Public Key (PK) modular exponentiation algorithms, DL-SCA can distinguish the true and fake operations because leakages could from, Memory addresses to store operands are different, Side channel information difference when dealing with multiplication and square, Manipulation of bit 1 and bit 0 are not exactly following the same process, and Side channel leakage link to the value of operands. DL-SCA may be more powerful than other SCA methods, because it is more robust with desynchronization More robust with noise, can deal with large number of samples (high dimension), continuing emerged new structures, more efficient hyper parameters tuning and so on.

The most popular DL-SCA is supervised DL with two phases: a profiling phase and an attacking phase. In the profiling phase, the model is trained with known n pairs (x_i, y_i), x_i is the sider channel curves (power, EM etc.), y_i is the label of bit value, 0 or 1. In the attacking phase, the DL system predicts the unknown bit value y_i from an input curve x_i. As noted earlier, attempting to disturb or avoid the profiling phase in the following manners is only of limited success: memory scrambling, randomizing the usage of registers, and randomize the internal data manipulated in the algorithm. The most powerful attack of DL-SCA is supervised version, means profiling with known labels are mandatory for training the network.

Solution

The traditional ways for solving this problem, like hardware jitter, software random delay, hamming weight balancing, register address randomization, etc. can reduce a signal-to-noise ratio (SNR), but cannot resolve the problem from the root. As DL-SCA is very configurable by choosing hyper-parameters, it is a challenge to promise security of implementation again DL-SCA by using only traditional counter measures. This invention proposes a new counter measure should be efficient by considering the characteristic of DL-SCA.

FIG. 1B provides a high-level solution to this problem that effectively randomizes the algorithm pseudo execution (operators and sequence of operations) itself. The invention consist to mix window methods and traditional algorithms in a random way, where the mix choice is based on a random picked at each execution step. This design ensures the labeling process by a DL system is not accurate, thereby fooling the profiling phase such that predictions by the trained model to produce a bit to operation sequence label won't provide useful information, but rather, false or misleading information. In the profiling phase, because of the randomization of operations, attacker cannot get y_i correctly, rather, they will get non-negligible number of fault labels. Correspondingly, if the learning does not work well, then the attacking won't be successful, because it cannot be more successful than the learning itself. Disturbing the profiling phase ensures the DL model learns with a high error rate, thereby ensuring any attack based on knowledge acquired from the learning phase will be useless. Current counter measures for DL-SCA still use all traditional methods, and it appears none are specific to target labeling.

Advantages

This invention provides at least two implementations for mixing of a non-window method and a partial window method. It does so to break the link between side-channel patterns and underlying facts, which dramatically increase the labeling errors, and disrupts the profiling phase. In such regard, it is efficient against new DL-SCA by fooling the profiling. It is also efficient against traditional template attacks. The performance has no change compare to the base algorithm because same number of operations will be kept. Today DL-SCA is widely deployed for certification process, and these inventive embodiments will reduce much of the risk of leakage.

As seen in FIG. 1B, the Algo_A_process (AAP) 140 is the normal execution sequence of operators per loop for a respective "traditional" SCA algorithm (e.g. SAMA, ATOMIC, ML). Here, the loop comprises that set of instructions (operations) relevant and necessary to perform the modulo exponentiation in accordance with the SCA algorithm. Each SCA algorithm will implement its modulo exponentiation loop (or point multiplication) in a unique way to minimize side channel leakage, and ultimately minimize detection of the number of operations established by the bits of the private key 102. The distinction of operands used in an algorithm can however provide exploitable side-channel leakages to an attacker. Accordingly, the Algo_window_process (AWP) 160 is the altered execution sequence of operators per loop for a respective SCA algorithm (e.g. SAMA, ATOMIC, ML). Successful countermeasures consist of using exponentiation algorithms where the sequence of multiplications and squarings does not depend on the secret exponent. The inventive contribution here proposes, and provides concrete implementations, of modifications to the traditional SCA algorithms for protecting their modular exponential algorithms against deep-learning side-channel attacks.

FIG. 2A depicts a first implementation of pseudo-code for window-bit-level mixing with a Side Channel Attack (SCA) algorithm in accordance with an embodiment. It is called a bit-level mixing because it operates with an SCA algorithm according to the size of the window level at the bit-level. A brief walk through of the pseudo code is in order.

At line 1, the function name is provided (Algo_A_DL_Safe) with the argument list (M-message, D-private key, P-prime). Lines 2-3 are a for loop whereby a multiplication vector of size $2^N-3+1$ is precomputed. The multiplication vector comprises the indexed multipliers for the modular exponentiation: $M[i]=M^{i+2}$ modulo P, where the modular exponentiations perform M raised to the power D modulo P via said operation sequences, where a message is M, modular is P, and said private key is D. The first two multipliers M0 and M1 are trivial and not included in the multiplication vector (hence, we skip the value 0 and 1). This is also the reason for the +2 index; namely, because M[0] becomes the second term of the precomputation vector. This precomputation can be more memory saving by way of an SCA safe way that only keeps the M[r].

At line 4, a random number is generated from the set of real integers 0 to $2^N-3$, where N is the bit-length (size) of the window. N is the bit-length of the window. N=2, means we use 2 bits window (each loop pick up 2 bits of exponent from MSB to LSB), then we will have 4 possible value of 2-bits (00,01,10,11), we precompute an array M contains 2 values of M2, M3, we don't need M0 and M1 which is trivial value no help for security. So the random number r is the index in array M, chosen from [0, 1], i.e. [M2, M3]. For N=3 case, we have 8 values, and calculate [M2, M3, M4, . . . , M7], then r can chose from [0,1,2,3,4,5].

At line 5, the code for initializing the SCA algorithm begins. Lines 6-10 form the main loop whereby for each N-tuple of bits (selected according to the non-overlapping sliding window having a bit-length, N), that N-tuple of bits is numerically compared to the random number (generated at line 4) plus (+) a linear increment (e.g., N-bit tuple==(r+2)?). Here, the linear increment is 2, since the 0 and 1 indexes were skipped as being trivial in that they add no security. However, the linear increment can be any one of the real numbers in the set 0 onward. If there is a match, then the code proceeds to line 8 to perform the Algo_window_process (the altered execution sequence of operators per loop; 160 in FIG. 1B) using the precomputed vector using that specific index established by the random number, r. That is, the value of the precomputed vector used is at the index that corresponds to the random value for that specific loop, but does not include the linear increment (+2). Note however, that the value selected from the precomputed vector is indexed directly with the random number (e.g., M[r]).

If there is not a match at line 7 (e.g., N-bit tuple==(r+2)?), then the code proceeds to perform the Algo_A_process in the normal manner at line 10. As will be seen ahead, normal, means the SCA algorithm will perform in its traditional manner (e.g., square and multiply always using its default insertion of fake multiplication operators). This sliding non-overlapping window bit-level mixing between the altered execution sequence (AWP) and the normal execution sequence (AAP) of the SCA algorithm continues on a looping basis for each N-bits of the private key, D as seen by the for loop in lines 6-10. Once the looping has ended, the function returns at line 11.

Figure 2B:
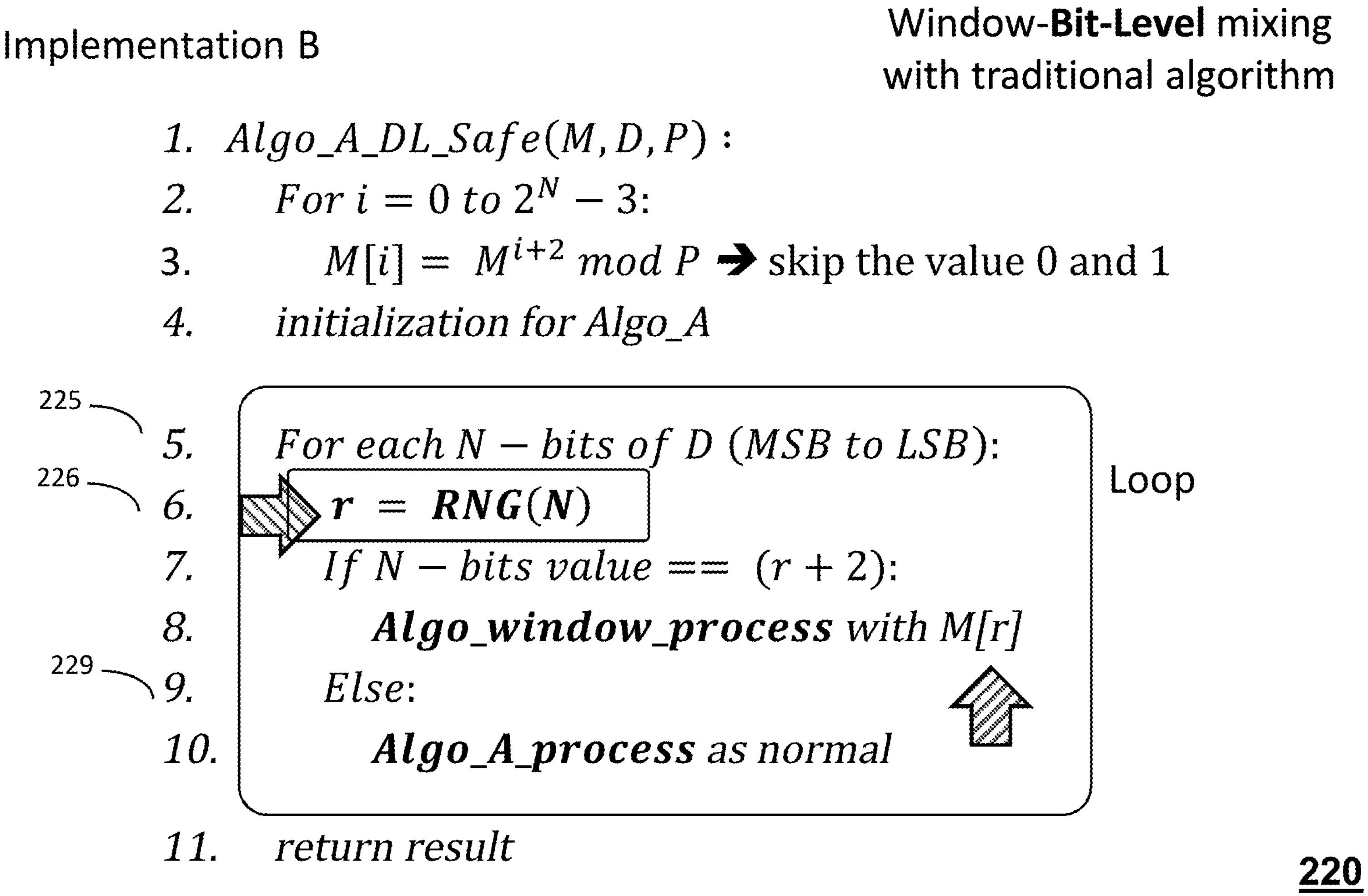
FIG. 2B depicts a second implementation of pseudo-code for window-bit-level mixing with a Side Channel Attack (SCA) algorithm in accordance with an embodiment.

FIG. 2B depicts a second implementation of pseudo-code for window-bit-level mixing with a Side Channel Attack (SCA) algorithm in accordance with an embodiment. It is called a bit-level mixing because it operates within an SCA algorithm at the bit level; it is more granular than an operation performed at the N size window level. The difference between this implementation and that of FIG. 2A, is that the initialization of the random number occurs within the "for" loop; that is, a random number is generated on each cycle of the operation sequence processing loop. FIG. 2A is the case where the random number, r, is generated once during initialization steps prior to a looping, wherein said mixing the windowing process is performed on a bit-by-bit basis of the N-tuple, to provide a window bit-level mixing with said counter SCA algorithm. FIG. 2B is the case where said random number, r, is generated during said lopping for each said loop, wherein said mixing the windowing process is performed on a bit-by-bit basis of the N-tuple, to provide a window Bit-level mixing with said counter SCA algorithm. In this second implementation, at line 3, the precomputed powers of M[i] for all i must be stored for this option. At line 7, the memory access must be secure against SCA using scrambling, permutations, shuffling, etc.

Figure 3A:
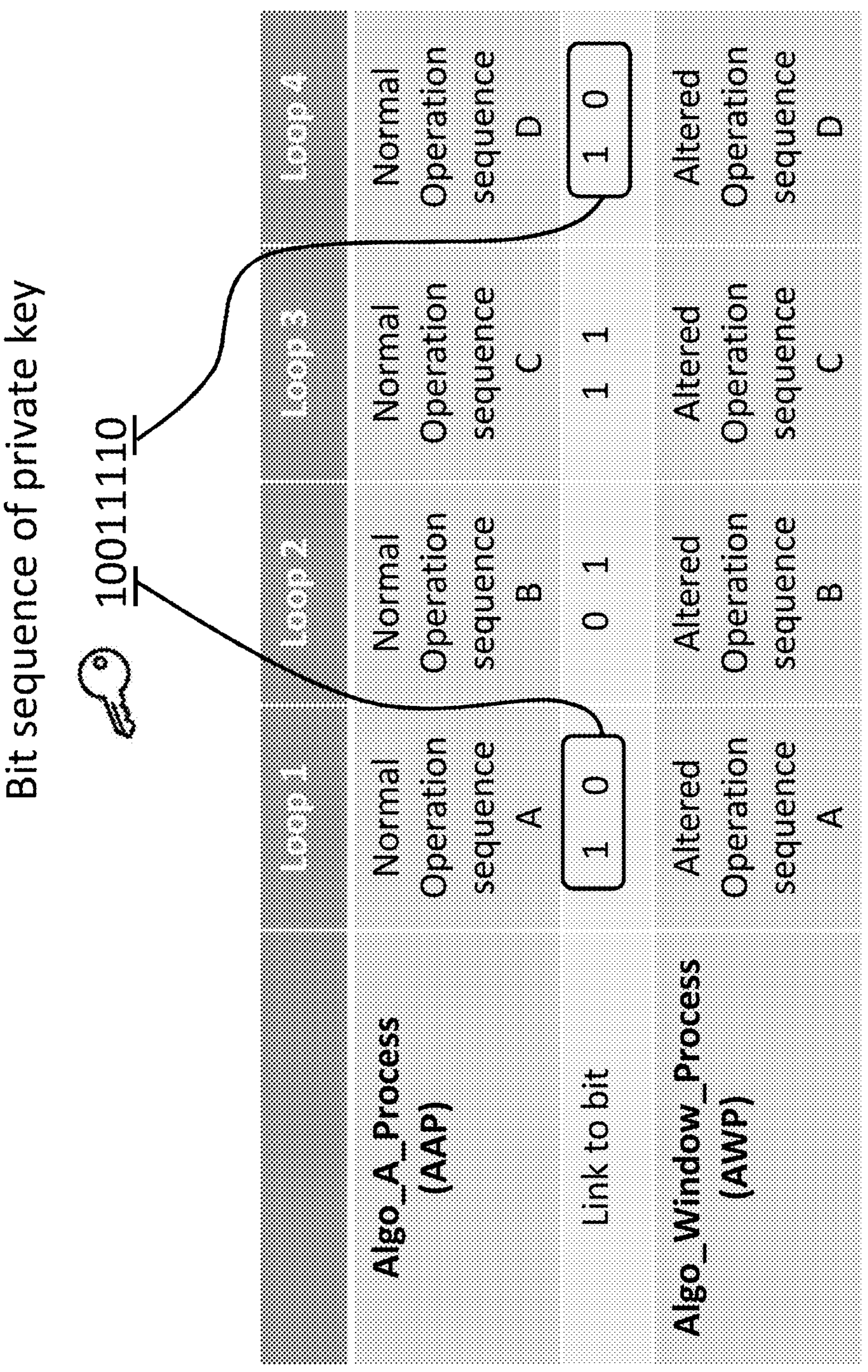
FIG. 3A depicts a high-level chart showing how bits are linked from a private key to a sequence of cryptographic operations used during multiple processing loops in accordance with an embodiment.
Figure 3B:
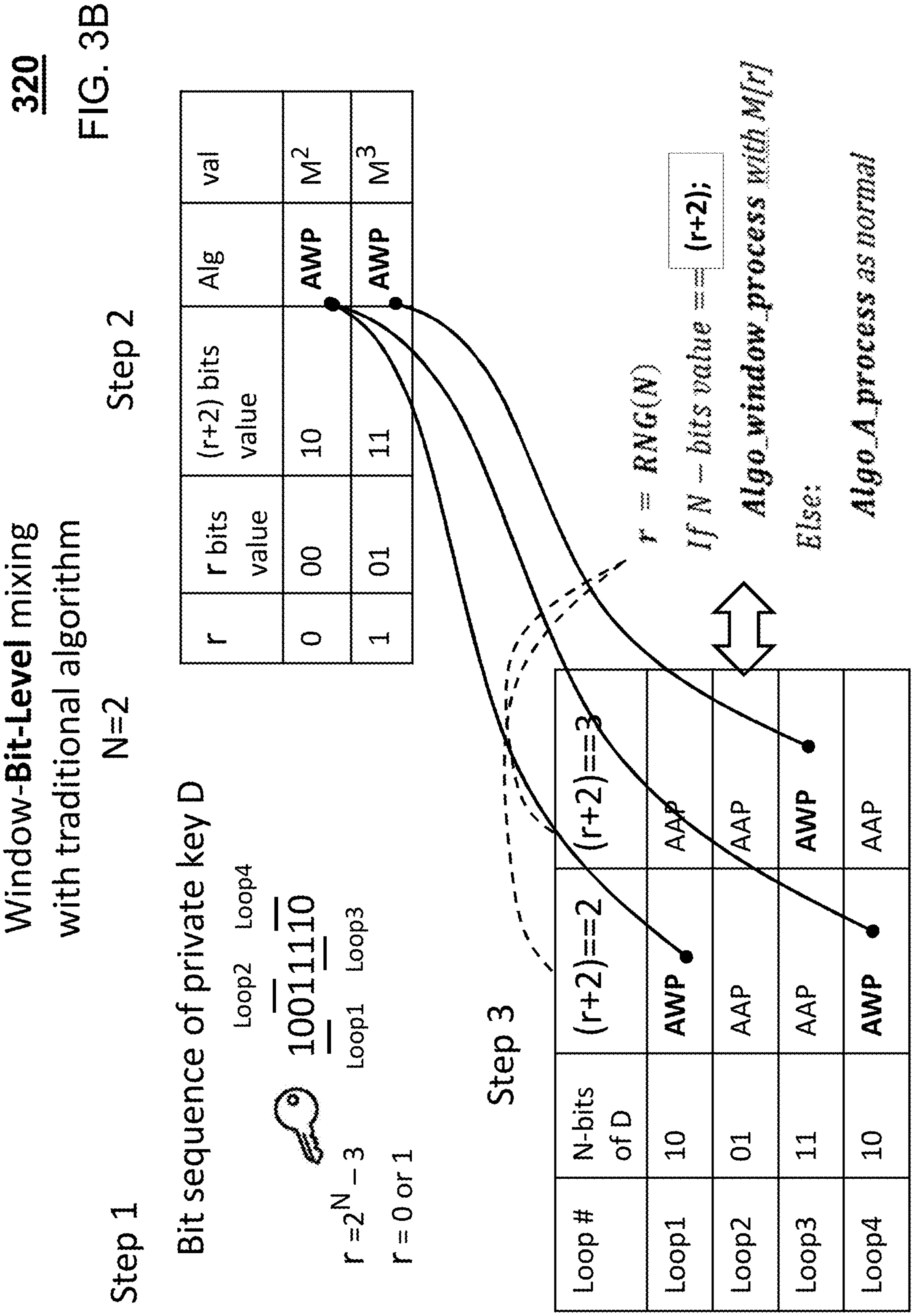
FIG. 3B visually illustrates how a sliding window of size N=2 is applied on a bit sequence of a private key by way of a random number to either select an altered operation sequence or a normal operation sequence for that window interval according during each 20 processing loop in accordance with an embodiment.

An analysis of the pseudo code of FIGS. 3A and 3B is in order.

Attacker control the M, D, P during profiling, but r is random chosen each time, the precise S,M sequence cannot be got, then link bit manipulation curves $x_i$ to bit value $y_i$ won't be 100% correct Error rate link to window size N and bit length L of secret D. We have ($L*2^{-N}$) bits will use window methods and cannot be labeled correctly.

The Algo_window_process and Algo_A_process can be designed to use same sequence of operations Even they are not same and attacker can separate S, M, they cannot define the bit value of Algo_window_process The operation sequence also legal for Algo_A_process Random choice of r let M[r] is unknown Pseudo code use Left to Right, but same logic for Right to Left.

FIG. 3A depicts a high-level chart showing how bits are linked from a private key to a sequence of cryptographic operations used during multiple processing loops in accordance with an embodiment. Looking at the bit sequence of an example private key 10011110, one sees that for an N=2 size window, each loop will index sequentially into N-bits of the private key. For example, at loop1, the first two bits 10 corresponding to <u>10</u>011110 of the private key are analyzed. At loop2, the next two bits 01 corresponding to 10<u>01</u>1110 of the private key are analyzed. The analysis here is the linking of the operations sequences associated with that window (N=2) to the bits of the private key. Recall, the exercise in deep-learning is to learn the labelling of the private key bits to certain operations by the cryptographic processor (see FIG. 1A). This loop chart is a high-level illustration to show how bits will be linked from the private key to normal (140 in FIG. 1B) operation sequences via AAP, or altered (160 in FIG. 1B) operation sequences via AWP. The next two figures FIG. 3B and FIG. 3C illustrate the math of the low-level implementations for window bit-level mixing.

FIG. 3B visually illustrates how a sliding window of size N=2 is applied on a bit sequence of a private key by way of a random number to either select an altered operation sequence or a normal operation sequence for that window interval according during each processing loop in accordance with an embodiment. There are three primary steps to follow to visualize the algorithmic implementation of window bit-level mixing with an SCA works. In step 1, we see the bit-sequence and how each processing loop that corresponds to execution sequence of an SCA algorithm selects the N-tuple from the private key. In step 2, we have a table showing the random number, its bit sequence, its bit sequence plus a linear increment (+2), corresponding to the selected algorithm (either AWP or AAP), and the value from the precomputed vector references by the random number (e.g. M[r=0] is M2, M[r=1] is M3) not using the linear increment. Step 3 is the real-time implementation of the SCA algorithm whereby for each loop the N-tuple bits are selected from the private key, the random number is generated (or pre-calculated) for each loop of lines 6-10 of FIG. 3A (pseudo code shown on right), and that random number (plus linear increment) is compared to the N-tuple to determine which algorithm is randomly selected, either AWP or AAP. This intentional randomization will preemptively introduce future errors in a deep-learning labeling process of operation sequences of said counter SCA algorithm to bit values of a private key used during said execution of said counter SCA algorithm.

Figure 3C:
FIG. 3C visually illustrates how a sliding window of size N=3 is applied on a bit sequence of a private key by way of a random number to either select an altered operation sequence or a normal operation sequence for that window interval according during each processing loop in accordance with an embodiment.

FIG. 3C visually illustrates how a sliding window of size N=3 is applied on a bit sequence of a private key by way of a random number to either select an altered operation sequence (AWP) or a normal operation sequence (AAP) for that window interval during each processing loop in accordance with an embodiment. The steps are similar to that of the preceding figure, except that the number of matching opportunities has increased in Step 3, because the selection of the random number has increased due to the larger window size, N=3; namely, randomizations are exponential base 2 because r=$2^N$−3. Here, we also clearly see that every loop of the SCA algorithm operation sequence will be subject to the AWP at least once. Therefore, as the number of loops increases, the randomizations are equally applied over the loop space thereby achieving uniform random distribution. In this manner, the uniformity of the randomizing preemptively introduces future faults in a deep-learning labeling process of operation sequences to bit values.

Figure 4A:
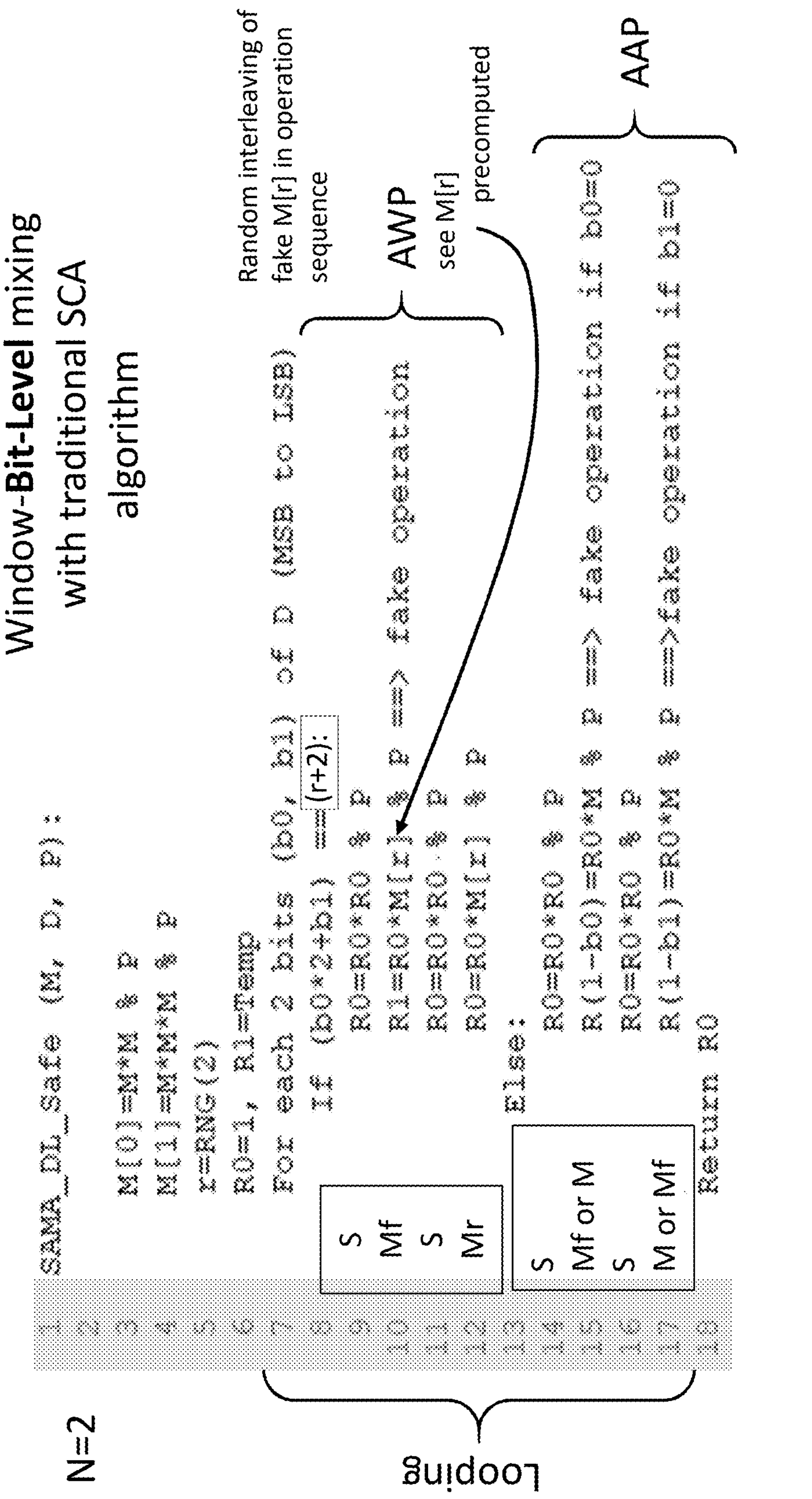
FIG. 4A depicts exemplary pseudo-code for window-bit-level mixing for protecting modular exponentiations with a first specific Side Channel Attack (SCA) algorithm in accordance with an embodiment.

FIG. 4A depicts exemplary pseudo-code window-bit-level mixing for protecting modular exponentiations with a first specific Side Channel Attack (SCA) algorithm in accordance with an embodiment. Let's use SAMA (square and multiplication always) modular exponential algorithm as an example. SAMA is designed as SCA-safe, because each bit will do the same operation, in theory, they are not distinguishable. The figure shows use of "if . . . else" statements for easy explanation only, but, in practice they are not used. In this example, N==(equals) 2, but other positive numbers can be used. In practice, for a long time as a leakage point in SCA, in order to have a uniform execution flow for different cases, the if . . . else . . . to branch different conditions are not used. Other methods to do that are contemplated.

Here, we see the AWP implementation on top (lines 9-12), and the AAP implementation on the bottom (lines 14-19), whereby the selected algorithm (AWP or AAP) for each processing loop is a function of the random number in line 7. We see the comparison math at line 8, wherein the N-tuple (seen as b0*2+b1) is compared to the random number plus linear increment (seen as r+2) to determine which SCA algorithm to apply (either AWP or AAP). In the SAMA case here, we see the interleaving using M[r] with indexing by the random number as an intended fake operation for the AWP selection. Whereas we see the normal fake operations of SAMA when the AAP is selected. Again, the window bit-level mixing approach herein preserves the traditional AAP algorithm, and supplements it with an AWP that introduces similar insertions of a multiplier term from a precomputed vector according to a randomization process; namely, the random selection according to the comparison in line 8. The basic process for SAMA is as follows:

```
SAMA (message M, modular N, private_key D)
  R0 = 1
  R1 = Temp
  For each bit b from MSB to LSB of D
    R0 = R0*R0 % N
    R(1−b) = R0*M % N  ← fake operation if b==0
  Return R0
```

From the side-channel point of view, each bit will include a modular square and a modular multiplication. For D which has 1024 bits will always have 1024 square and 1024 multiplication, no bias. For DL-SCA point of view, the labeling also simple, as we know the value of private key for profiling, from the PO/EM traces will be easy to locate the operation of each bits and they are perfectly match each bit value, that means the labeling will be 100% correct, that is the basis for training the model.

Then DL can find the leakage to discriminate bit 0 and bit 1. The new counter measure algorithm is following (just for easy understanding, not real implementation where code will not use if . . . else logic):

```
SAMA_new (message M, modular N, private_key D)
    P0 = 1
    M2 = M*M % N
    M3 = M*M*M % N
  Mx = random chose within [M2, M3]
      The line above can be done in SCA secure way
  R0 = 1, R1 = Temp
  For each 2 bits (b0, b1) of D (MSB to LSB)
    If (b0*2 + b1) == x:
      R0 = R0*R0 % N
      R1 = R0*Mx % N      ← fake operation
      R0 = R0*R0 % N
      R0 = R0*Mx % N
    Else:
      R0 = R0*R0 % N
      R(1−b0) = R0*M % N   ← fake operation if b0 = 0
      R0 = R0*R0 % N
      R(1−b1) = R0*M % N      ← fake operation if b1 = 0
  Return R0
```

Correspondingly, FIG. 4B shows a specific N=2 link-to-bit mapping of the SAMA algorithm of FIG. 4A in accordance with an embodiment. Again, other values of N are applicable. Each column of the table represents a loop with a corresponding executions sequence. For example, in loop 1, we see the normal S-M-S-Mf (i.e., Square-Multiply-Square-fake Multiply) operation sequence that we see in the pseudo-code in lines 9-12. The bold box overlay types correspond to selection of the AWP. The thin box overlay types correspond to the AAP. We can expect the selection distribution of AWP over AAP similarly as in FIGS. 3B and 3C; namely, AWP is selected on certain loops depending on the result of the comparison step.

The 1$^{st}$ entry from top for SAMA DL_Safe shows the corresponding link to bit for the case where r, although unknown by the attacker, is in fact (r+2=2). The 2$^{nd}$ entry for SAMA DL_Safe shows the corresponding link to bit for the case where r, although unknown by the attacker, is in fact (r+2=3). There can be as many entries in the table as the value of N. Here we only show the first two. That is, r=2 and r=3 are just separate examples as to how the operator sequence would differ based on the value of "r", and it's "not known" from the sense of the attacker that is trying to link/label the operation sequences to the bits (of the key); that is, the attacker doesn't know the value of "r" so cannot learn the labeling, which ultimately introduces the labeling errors in the supervised training of the machine learning model. So, "r" is unknown for attacker, but known for each execution; the table gives the case of different r gives different sequence to fooling the labeling.

For classic SAMA, pseudo code can be:

```
if bit = 1
  R = R*R % P
  R = R*M % P
else
  R = R*R % P
  T = R*M % P => T is a trash register
```

For classic window method, pseudo code can be:

```
M1 = M; M2 = M*M%P; M3 = M*M*M%P
R = R*R%P
R = R*R%P
R = R*Mb%P => b is the 2-bits value
```

Here, we can see the SCA sequence will be always S-S-M, which will never happened if SAMA used, then will be easy to identify window method. In contrast, by way of the inventive methods here, in order to imitate the behavior of SAMA, a fake multiply Mf is added to the window method, i.e. S-Mf-S-M.

```
R = R*R%P
T = R*M%P => T is a trash register
R = R*R%P
R = R*Mb%P => b is the 2-bits value
```

The purpose is to let the attacker always see SMSM sequence, cannot identify the window method. Briefly, 'fake' as seen in the drawings and pseudo code, means the term is dropped. The program/method stores the result of the operation into a trash register and it is not used for next bit, which means it is dropped. The 'M' is not fake, we use real 'M' and 'R' to make the multiplication more like a real operation from the SCA point of view. The window method itself is not fake, nor are the multiplication operations that use M[r] or Mf terms. The multiply with the precomputed vector (e.g., M[r] and terms therein) is not a fake operation.

A deeper analysis of the code above (reproduced in FIG. 4A) is in order. Briefly, the "x" in the table of FIG. 4B (and also FIGS. 5B and 6B) is a designation meaning "no specific" bit value link to the operations. For bit sequence 10011110, when we consider 2-bits window, we will have following operations:

```
If x=2:
        Sequence:     S-Mf-S-Mx S-Mf-S-M S-M-S-M S-Mf-S-Mx
        Link to bit:     -  10  0  1  1  1  -  10
If x=3:
        Sequence:     S-M-S-Mf S-Mf-S-M S-Mf-S-Mx S-M-S-Mf
        Link to bit:     1  0  0  1  -  11  1  0
```

Mf - means fake multiply
Mx - multiplication with randomly chosen in M2 or M3, where x=2 or x=3

1. For the labeling of profiling phase will be impossible 100% correct, even they can separate S-Mf and S-M, the randomness of Mx location will break the link between pattern and bit value, and for 2 bits window we have ¼ pattern cannot be correctly labeled.
2. There has same number of operation as SAMA, no performance loss, except need one more buffer for Mx
3. If we consider random chosen of x in each execution, attacker won't know should link S-Mf-S-M to 10b or link to 11b
4. If we chose 3 bits window, will has 6 values of x except 0 & 1, more difficult for linking pattern to bit values but with ⅛ pattern using window methods, less number of fooling than 2 bits window, the number of bits in a window can be chosen as a parameter
5. This method also breaks the SAMA 'conflict' attack (use or not use same register value for multiply and square will link to bit value). see https://doi.org/10.13154/tches.v2019.i2.132-161
6. We can also use sliding window method to maximize Mx cases but will be more complicate for implementation. Here we refer "sliding window" as overlapped window method, i.e. moving the window bit by bit until find a match. In contrast, the non-overlapped approach always move N-bits. For this overlapped sliding window, it has more probability to find the match (=r+2) to increase the proportion of the window method used.

In this example, for bit sequence 10011110 of private key we have following operation sequence: S—Square, Mf—fake multiply, Mr—multiply with M[r], M—multiply with M, where N=2 is used in the generation of table of FIG. 4B To create 2 labels S–Mf=0, S–M/S–Mr=1 will have ¼ errors as SM and SMr cannot separate, S–Mf–S–Mr will be wrong labeled as 01 while S-Mf for nothing and S-Mr for two bits.

To create 3 labels S–Mf=0, S–M=1, S–Mr=2 will have ¼-⅛ errors as r not known, labeling have to guess.

To create 2 labels (confilict) Mf–S=0, M–S/Mr–S=1 will have ¼-⅛ errors as r is unknown, Mr–S could be 0 or 1.

In conclusion, from the SCA point of view, SAMA with the inventive interleaving method is the same square+multiply pattern as usual, but here, they link to correct bit values with 75% correctness (2 bits windows), and 25% pattern cannot link to correct bit values. If consider the randomness of x, will have 50% pattern cannot be correctly labeled. Then the DL-SCA training will has more than 50% patterns are wrong labeled. The trained model won't work for prediction. This method can also be extended to other algorithms like Montgomery Ladder, ECDSA used DaA (double and addition) etc, as described next.

Figure 5A:
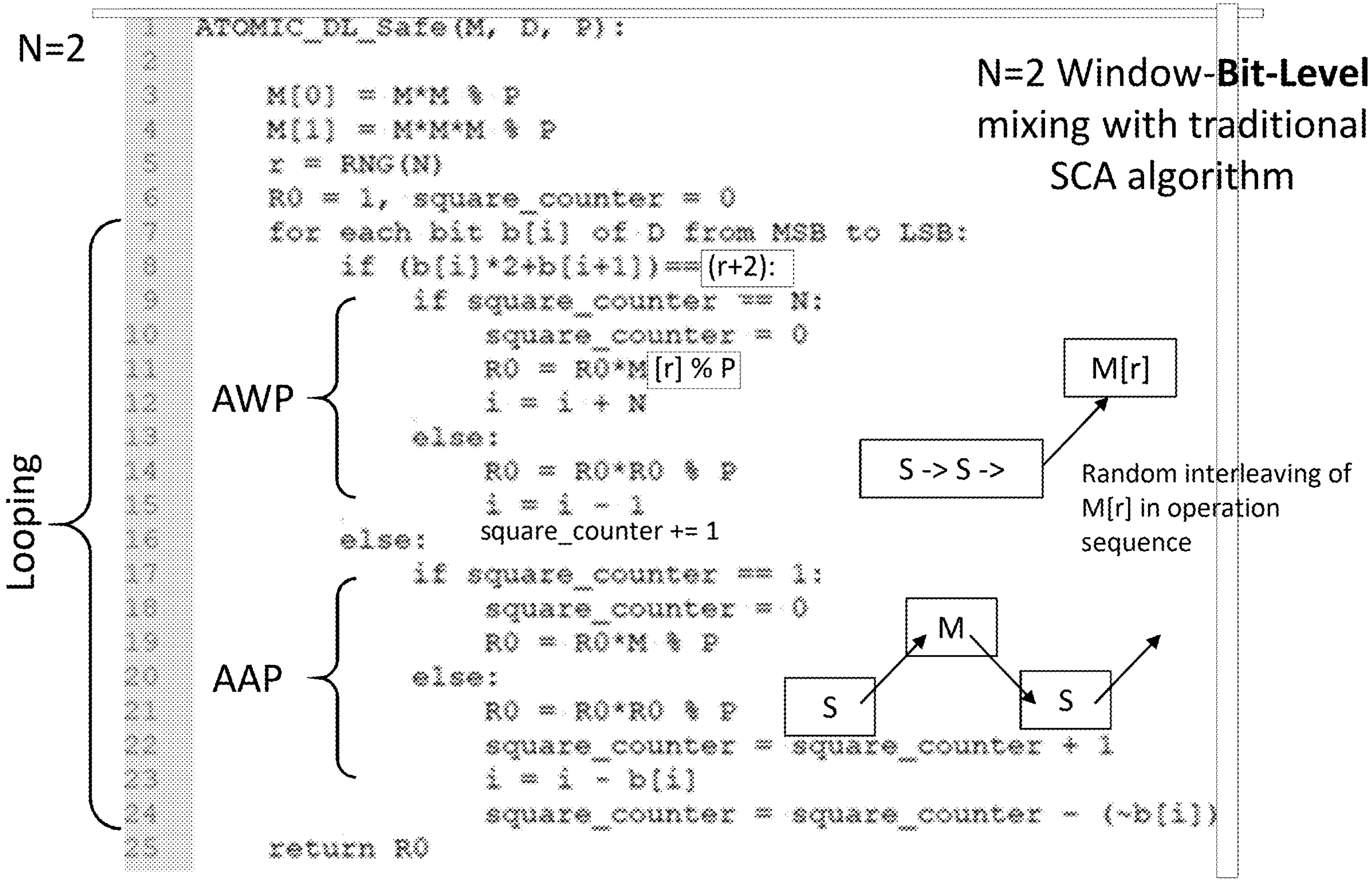
FIG. 5A depicts exemplary pseudo-code for window-bit-level mixing for protecting modular exponentiations with a second specific Side Channel Attack (SCA) algorithm in accordance with an embodiment.

FIG. 5A depicts exemplary pseudo-code for window-bit-level mixing for protecting modular exponentiations of a ATOMIC Side Channel Attack (SCA) algorithm in accordance with an embodiment in accordance with an embodiment. Briefly, FIG. 5A also shows use of "if . . . else" statements for easy explanation only, but, in practice they are not used. In this example, N==(equals) 2, but other positive real numbers can be used instead. Here, we see the AWP implementation on top (lines 9-15), and the AAP implemention on the bottom (lines 17-24), whereby the selected algorithm (AWP or AAP) for each processing loop is a function of the random number looping at line 7. We see the comparison math at line 8, wherein the N-tuple (seen as b[i]*2+b[i+1]) is compared to the random number plus linear increment (seen as r+2) to determine which SCA algorithm to apply (either AWP or AAP).

In the ATOMIC case here, there are no fake multiply interleaves using M[r]. Rather, all the operations are true, and instead the inventive implementation makes use of the M[r] with indexing by the random number as an actual operation (e.g. modular exponentiation for RSA, or point addition for ECC) for interleaving. Again, the window bit-level mixing approach herein preserves the traditional AAP algorithm, and supplements it with an AWP that introduces similar insertions of a multiplier term from a precomputed vector according to a randomization process; namely, the random selection according to the comparison in line 8.

Correspondingly, FIG. 5B shows a specific link-to-bit mapping of the ATOMIC SCA algorithm of FIG. 5A in accordance with an embodiment for N=2. Again, other real positive numbers of N are applicable. Each column of the table represents a loop with a corresponding executions sequence. For example, in loop 1, we see the normal S-M-S (i.e., Square-Multiply-Square) operation sequence that can be seen in the pseudo-code. The bold box overlay types correspond to selection of the AWP. The thin box overlay types correspond to the AAP. Similarly, the 1$^{st}$ entry from top for ATOMIC DL_Safe shows the corresponding link to bit for the case where r, although unknown by the attacker, is in fact (r+2=2). The 2$^{nd}$ entry for ATOMIC DL_Safe shows the corresponding link to bit for the case where r, although unknown by the attacker, is in fact (r+2=3). There can be as many entries in the table as the value of N. Here we only show the first two.

The "x" in the table of FIG. 5B (and also FIGS. 4B and 6B) is a designation meaning no specific bit value link to the operations. Like the first S-S-Mr, the three operations all together for '10' because the implementation uses the window method. The second S-S-M doesn't use window method (it uses the "traditional" SCA algorithm), so S link to '0', S-M link to '1'. From the attacker's point of view, if the attacker can separate S and M, they will see a sequence S-S-M-S-S-M-S-M-S-M-S-S-M, they cannot decide the meaning of each 'M' even if they know the algorithm (here is Atomic), it can be part of the operation of bit 1 (S-M), or bits '10' (r=2) or bits '11' (r=3).

In this example, for bit sequence 10011110 of private key we have following operation sequence: S—Square, Mr—multiply with M[r], M—multiply with M, where N=2 is used in generation the of table of FIG. 5B.

- To create 2 labels S=0, M/Mr=1 will have at least-errors as the sequence changed by window methods.
- To create 3 labels S=0, M=1, Mr=2 will have at least ¼-⅛-errors as r is unknown. ATOMIC considered as not secure anymore with DL-SCA, but with our method, it still can be used as complimentary algorithms (ex. In united methods)

Figure 6A:
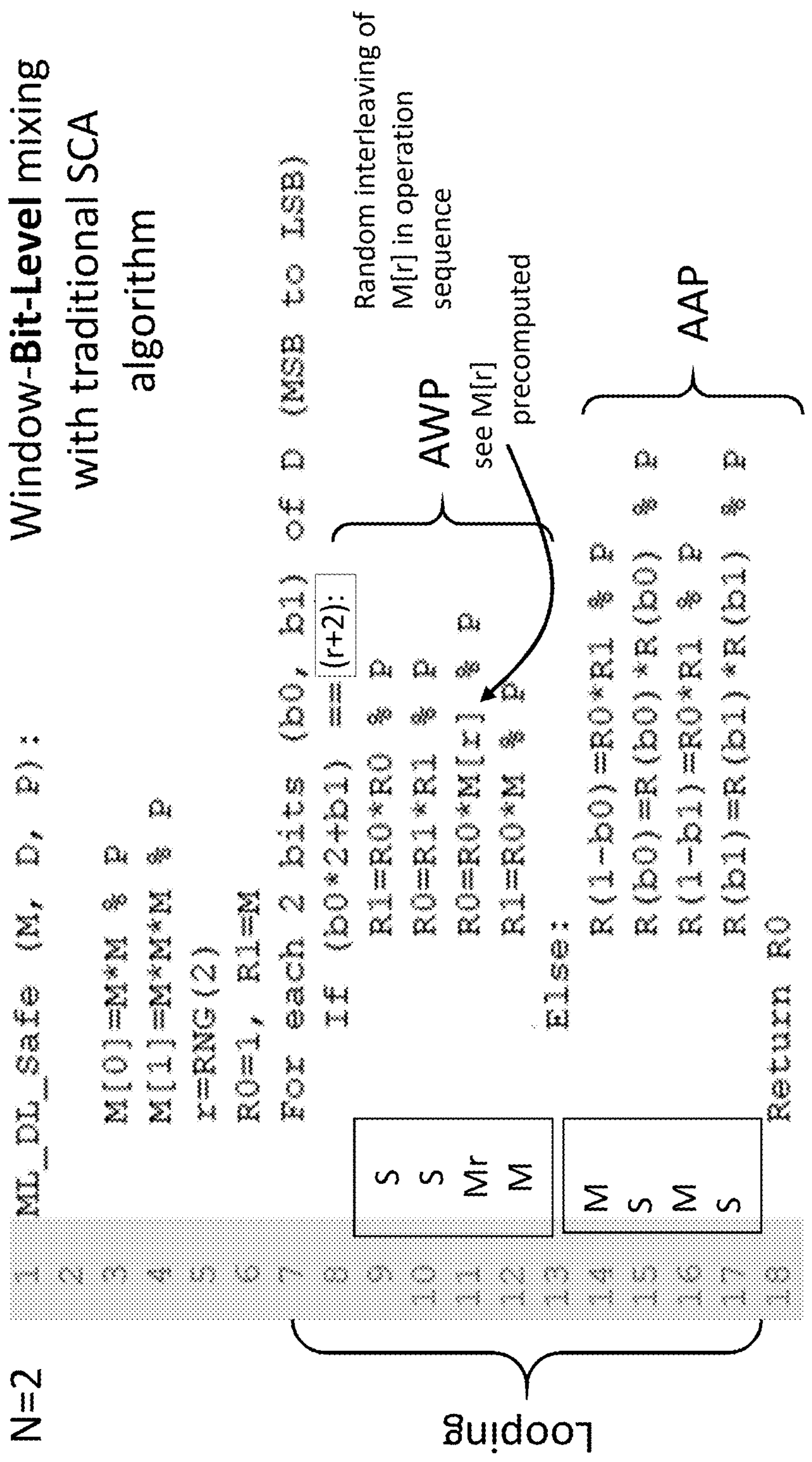
FIG. 6A depicts exemplary pseudo-code for window-bit-level mixing for protecting modular exponentiations with a third specific Side Channel Attack (SCA) algorithm in accordance with an embodiment.

FIG. 6A depicts exemplary pseudo-code for window-bit-level mixing for protecting modular exponentiations with a Montgomery Ladder (ML) Side Channel Attack (SCA) algorithm in accordance with an embodiment. Briefly, FIG. 6A also shows use of "if . . . else" statements for easy explanation only, but, in practice they are not used. In this example, N==(equals) 2, but other positive real numbers can be used instead. Here, we see the AWP implementation on top (lines 9-12), and the AAP implementation on the bottom (lines 14-17), whereby the selected algorithm (AWP or AAP) for each processing loop is a function of the random number looping at line 7. We see the comparison math at line 8, wherein the N-tuple (seen as b0*2+b1) is compared to the random number plus linear increment (seen as r+2) to determine which SCA algorithm to apply (either AWP or AAP).

For ML we cannot add fake M like in SAMA because we must keep the relationship between registers, but consider the randomized r, each time the SCA sequence is evaluated and is always different, to still supply protection. Hence, in the ML case here, there are also no fake multiply interleaves using M[r]. All the operations are true, and instead the inventive implementation makes use of the M[r] with indexing by the random number as an actual operation (e.g. modular exponentiation for RSA, or point addition for ECC) for interleaving. Again, the window bit-level mixing approach herein preserves the traditional AAP algorithm, and supplements it with an AWP that introduces similar insertions of a multiplier term from a precomputed vector according to a randomization process; namely, the random selection according to the comparison in line 8.

FIG. 6B shows a specific link-to-bit mapping of the ML SCA algorithm of FIG. 6A in accordance with an embodiment for N=2. Again, other real positive numbers of N are applicable. The interpretation of the entries in the table are similar to FIG. 6B, except the operation sequences and number of operations per link differ because it is linked to the ML algorithm. For example, in ATOMIC there were 3 operators (S-M-S) per looping, whereas for ML there are 4 operators (M-S-M-S).

In this example, for bit sequence 10011110 of private key we have following operation sequence S—Square, Mr—multiply with M[r], M—multiply with M, where N=2 is used in the generation of table of FIG. 6B.

- Montgomery Ladder (ML) is state of the art for best protection from DL-SCA, and the inventive method herein make it more robust (difficult to break) by introducing label errors.
- Window methods can be identified by sequence S-S-Mr-M different from M-S-M-S, but r is unknown will give ¼-⅛ errors for labeling

Other Embodiments—Elliptic Curve Cryptography (ECC)

ECC is a form of public key cryptography, in which one encryption key, known as a private key, is kept secret, while another, known as a public key, is freely distributed. It is a method of encoding data information so that only specific ECC enabled machines and devices can decode them. ECC is based on the mathematics of elliptic curves and uses the location of points on an elliptic curve to encrypt and decrypt information. Compared to RSA, ECC employs a relatively short encryption key—a value that must be fed into the encryption algorithm to decode an encrypted message. This short key is faster and requires less computing power than other first-generation encryption public key algorithms.

Elliptic curve scalar multiplication is the operation of successively adding a point along an elliptic curve to itself repeatedly. It is used as a means of producing a one-way function. ECC has a very unique mathematical structure that enables the process of taking any two points on a specific curve, of adding the two points and getting as a result another point on the same curve. ECC "math" is really a different type of mathematics based on equations of elliptic curves using dotting operations and point additions to represent the cyclic additions on the complex curves. Its performance depends heavily on the point multiplication operation, and so does its security. ECC "math" is really a different type of mathematics, based on elliptic curves, and using dotting operations and so forth to represent the cyclic additions on the curves.

The mathematics of an ECC point addition is done using the addition and multiplication operations in the elliptic number field; when you are using a prime field, that is equivalent to doing addition and multiplication modulo the prime. The addition operation in ECC is the counterpart of modular multiplication in RSA. ECC point doubling is the counterpart of modular square in RSA. Elliptic curve scalar multiplication is the operation of successively adding a point along an elliptic curve to itself repeatedly. In programming practice, it is referred to as point multiplication. There are three commonly defined operations for elliptic curve points, addition, doubling and negation. Computing a point multiplication is through repeated addition, and there are efficient ways, for example, double-and-add, to which the inventive aspects apply similarly. Accordingly, the embodiments herein presented above for mixing a windowing process with a counter side-channel-attack (SCA) algorithm according to a random number, r, generated during execution of said counter SCA algorithm using modular exponentiations stored in a precomputed vector apply similarly (almost as a substitution) to using multiple additions for ECC (also termed ECC point additions, ECC point multiplications or ECC dotting operations) stored in a precomputed vector.

Accordingly, with respect to FIGS. 4A, 5A and 6C, which were provided as RSA examples for the precomputed vector, "Multiplication" vector M[ ] containing modular exponentiations, in the ECC variation, a precomputed vector, "Addition" vector A[ ] will contain ECC point additions (e.g. A[r] for random number r). That is, the operations are same in logic, except we replace 'square' with→ 'doubling', and 'multiplication' with→'addition'. For ECC point operation, we define two functions for 'point doubling' and 'point addition', inside the functions, there have many finite field modular operation by using the point coordinate (X,Y) where X and Y are scalar. For example, pseudo-code high-level implementation of the window-bit-level mixing for the AWP (top) is shown:

```
function DaAA(scalar_D, point_G):
  R0 = infinite_point
  loop D from MSB to LSB by 2-bits:
    if (b0*2+b1) == (r+2):                /* ECC AWP */
      R0 = point_doubling(R0)
        or simply R0=[2]*R0, but here
        '*' is not simple as it is, it stands for a function
      R1 = point_addition(R0, A[r])
          or simply R1=R0+A[r], but here
        '+' is not simple as it is, it stands for a function
      R0 = point_doubling(R0)
      R0 = point_addition(R0, G)
    else                                  /* ECC AAP */
      do normal (traditional) SCA using ECC math
    end
```

To note, the pseudo-code descriptions of the previously mentioned algorithms (SAMA in FIG. 4A, ATOMIC in FIG. 5A, ML in FIG. 6A) using RSA style modular exponentiations apply similarly to the counter part ECC SCA algorithm implementations. For example, in SAMA (Square and Multiply Always), for the ECC variation, it is DaAA (double and add always). The invention herein applies to modular exponential case (e.g. RSA), and also to the equivalent point multiplication case (e.g. ECC). This is the same for the ATOMIC and ML algorithms.

Reduction to Practice

A method for countering a profiling of deep-learning side channel (SCA) algorithm to disrupt a training phase of a deep-learning model is provided. This method, and those discussed above, can be implemented on a computer, hardware, or other device such as that shown in FIG. 7 or FIG. 8. The method can include altering an execution sequence of modular exponentiations or point additions in a counter SCA algorithm, by, selecting a random number, r; generating a precomputation vector with values that will be selected from said precomputed vector and interleaved into said counter SCA algorithm according to the random number, wherein said values from said precomputed vector are indexed by r, generating a non-overlapping sliding window, and establishing a bit-length, N, of said window, where N is the number of bits in the window; looping through bits of a private key, D, that is subject of the SCA algorithm attack, according to said sliding window, wherein for each loop, an N-bit tuple from the private key is produced from the sliding window, wherein for each loop, the method comprises: comparing a value of the N-bit tuple to the random number plus a linear increment and, if the value is a match, indexing into said precomputed vector according to said random number, r, thereby extracting and interleaving values into an execution path of said counter SCA algorithm from said precomputed vector according to an index represented by said random number; otherwise, if the value is not a match, executing said counter SCA algorithm as normal, thereby not interleaving precomputed values into the execution path of said counter SCA algorithm, wherein the sliding window of the looping proceeds in a direction of most significant bit (MSB) to least significant bit (LSB), or in a direction of LSB to MSB, for bits of said private key, D, whereby the randomizing preemptively introduces future faults in a deep-learning labeling process of operation sequences to bit values.

Figure 7:
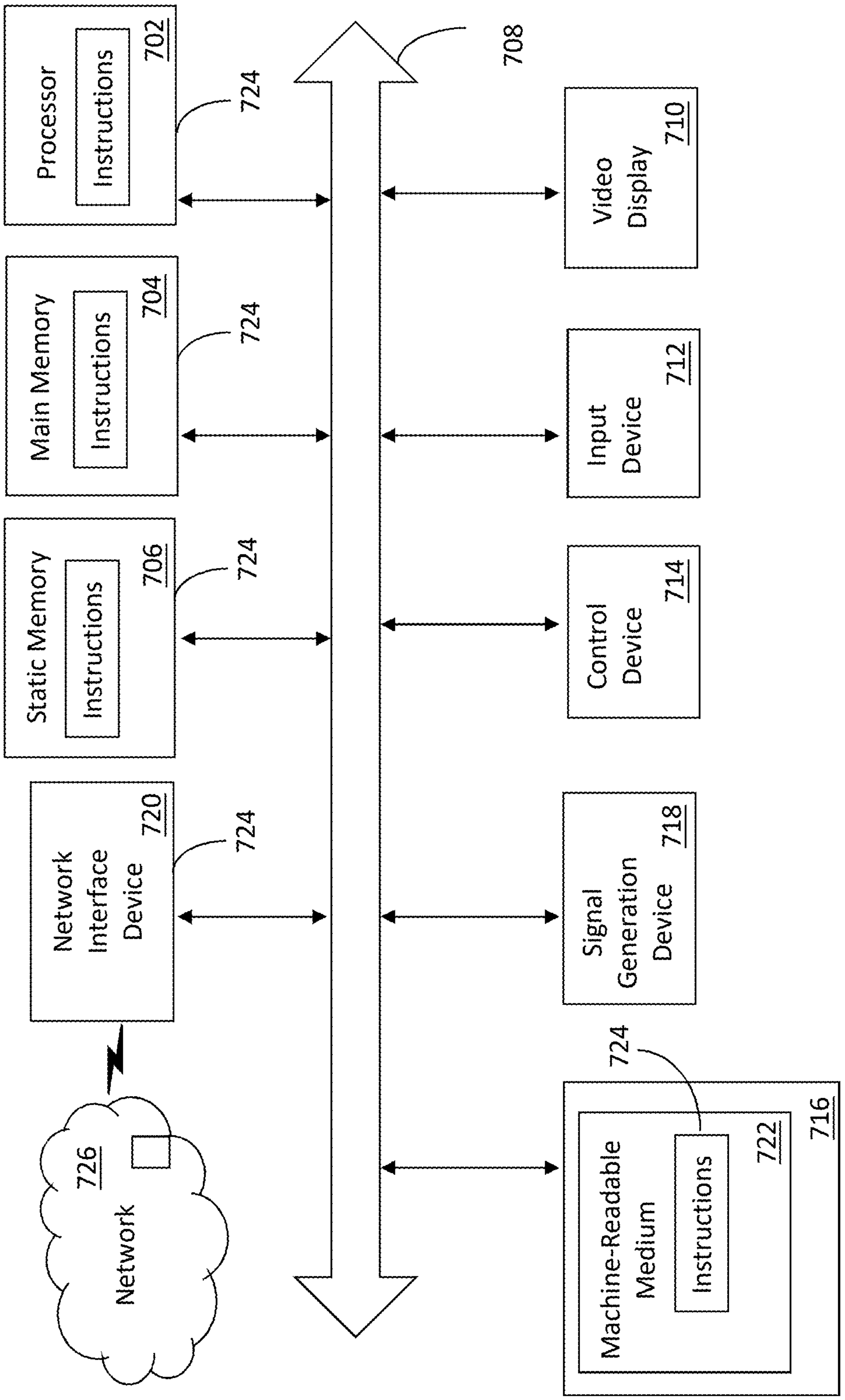
FIG. 7 depicts an exemplary diagrammatic representation of a machine suitable for use to perform the methods in accordance with an embodiment.

FIG. 7 depicts an exemplary diagrammatic representation of a machine 700 in the form of a computer system 700 within which a set of instructions, when executed, may cause the machine to perform any one or more of the methodologies discussed above (e.g. by the PAP 110, Issuing Authority 120, or Service Provider 130). In some embodiments, the machine operates as a standalone device, such as a computer, laptop, mobile device, remote control, or display. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a mobile device, a cell phone, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 700 may include a processor 702 (e.g., a central processing unit (CPU), a graphics processing unit (GPU, or both), a main memory 704 and a static memory 706, which communicate with each other via a bus 708. The computer system 700 may further include a video display unit 710 (e.g., a liquid crystal display or LCD), a flat panel, a solid state display, or a cathode ray tube (CRT)). The computer system 700 may include an input device 712 (e.g., a keyboard, touchless sensing unit 110), a cursor control device 714 (e.g., a mouse, touchless sensing unit 110), a disk drive unit 716, a signal generation device 718 (e.g., a speaker or remote control) and a network interface device 720.

The disk drive unit 716 may include a machine-readable medium 722 on which is stored one or more sets of instructions (e.g., software 724) embodying any one or more of the methodologies or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

Figure 8:
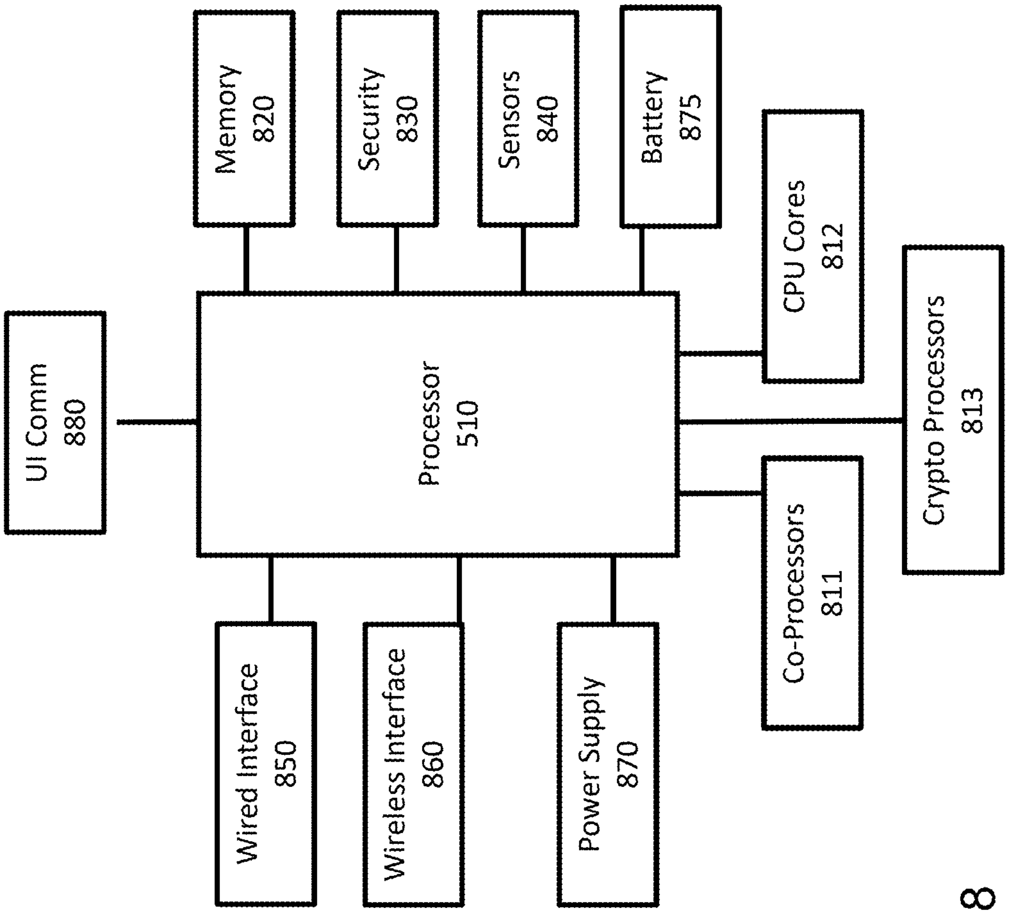
FIG. 8 illustrates a hardware platform suitable for use to perform the methods in accordance with an embodiment.

FIG. 8 illustrates a hardware platform 800 suitable for use as, or within, a computational processing environment for performing the aforementioned method steps of the Connected device 100. The platform 800 includes a processor 810, a memory 820, and a security 830, sensors 240, a communication module shown as wired interface 850 and/or a wireless interface, a power supply 870, a battery 875, and a User Interface (UI) 880. These components may be communicatively coupled as shown or by direct hardware interfaces there between, including, but not limited to electronics, circuits, wires, lines, logic, or gates, where suitable.

The processor 810 may include one or more data processing circuits, such as a general purpose and/or special purpose processor, such as a microprocessor and/or digital signal processor (e.g., GPU, uP, ASIC, DSP, CPLD, IC, etc.). The processor 810 is configured to execute computer program code in the memory 820, described below as a non-transitory computer readable medium, to perform at least some of the operations described herein as being performed by an identified component, module or software block. The computer program code can include computer instructions, assembly code, firmware, or embedded code, machine code, that when executed by the processor 810 causes the processor 810 to perform operations in accordance with one or more embodiments disclosed herein.

Specific examples (a non-exhaustive list) of the computer readable storage medium exemplified by memory 820 can include the following: a hard disk, a random access memory (RAM), a read-only memory (ROM), an erasable programmable read-only memory (EPROM), Flash memory (NAND, NOR), a solid state device (SSD), an appropriate optical fiber (FICON) with a repeater, an optical storage device, a magnetic storage device, or any suitable combination of the foregoing.

The processor 810 may also be communicatively attached to a co-processor 811 (on-board or off board), one or more CPU cores 812 and one or more crypto processors 813 (e.g., HW crypto accelerator) that assist in off-loading computational or processing tasks.

The sensors 840 can detect or measure a physical property and record, indicate, or otherwise responds to the sensory information. The sensors 840 provide for measurement of temperature, humidity, radio frequency, electromagnetic, light, force, pressure, acceleration, movement, position, tilt, and other physical interaction and environmental conditions. The Sensors 840 may further include a signal comparator, a phase comparator, an analog to digital converter, amplifier, signal filter, etc. used to enable the processor 810 to receive and process signals from one or more sensors.

The security module 830 provides for monitoring of security violations, security risks, unauthorized uses and attacks on the platform 800. It may be a mixed signal low-power microcontroller that include decision logic, memory or software and that communicatively couples to the sensors 840 and the processor 810. The security module 830 may include software and logic, or share resources and responsibilities with the processor 810, to detect security events, such as tamper levels, thresholds, and conditions.

The platform 800 may include a wired network communication interface 850 and/or a wireless interface 860, for example, a radio access communication transceiver. The wired network interface can include standard computer networking interfaces used in local area networks (LAN), wide area networks (WAN), over the Cloud, and the Internet and other frame based or packed based networks. The Ethernet interface can use TCP/IP and UDP protocols for 10/100/1000 Mbps transmission over standard Cat 5, Cat 5e, or Cat 6 cables. The radio access communication transceiver can include, but is not limited to, a LTE or other cellular transceiver, WLAN transceiver (IEEE 802.11), WiMAX transceiver, Bluetooth transceiver, NFC transceiver, Radio Frequency Identification (RFID) or other radio communication transceiver configured to communicate directly or indirectly (e.g., via a radio access node) with a network node.

The platform 800 may include User Interface (UI) communication (COMM) modules 880, for example, electronic data exchange or generic communication, such as Universal Serial Bus (USB), RS-232 serial port, smart card reader, Graphical User Interfaces (GUI), Light Emitting Diodes (LED), or other user related I/O interfaces.

The power supply 870 provides power to the electronic components of platform 800 and can include regulators and converters to provide required voltage and current requirements. The battery 875 can also provide power, for example, in low-power modes or when otherwise required for security reasons, for example, to maintain the contents of protected memory.

Further Definitions

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, at the embedded leve, firmware level, assembly level, or including an object oriented programming language such as Java, Go, C++, C#, VB.NET, Python or the like, conventional procedural programming languages, such as the "C" programming language, Perl, PHP, dynamic programming languages such as Python and Ruby or other programming languages. The program code may execute entirely on the user's computer, partly on the user's computer, as a stand-alone software package, partly on the user's computer and partly on a remote computer, entirely on the remote computer or server, or within the Cloud or other computer network. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (Saas), Backend as a Service (BaaS) for connecting mobile apps to cloud based services, and Security as a Service (SECaas).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method for protecting modular exponential and point addition algorithms executing on a device against profiling from a deep-learning side-channel attack, comprising the steps of:

mixing a windowing process with a counter side-channel-attack (SCA) algorithm according to a random number, r, generated during execution of said counter SCA algorithm;

including initialization steps of:

establishing a bit-length, N, of a window, where N is the number of bits in the window; and precomputing said multiplication vector, M, with a length of 2N−3, having index, i, values $$M[i] = M^{i+2} \bmod P$$
$$\text{for } i = 0 \text{ to } 2^N - 3$$

wherein said modular exponentiations perform M raised to the power D modulo P via said operation sequences, where a message is M, modular is P, and said private key is D whereby, values selected from a precomputed vector are interleaved into said counter SCA algorithm according to the random number, r, wherein values from said precomputed vector are indexed by r, thereby, preemptively introducing future errors in a deep-learning labeling process of operation sequences of said counter SCA algorithm to bit values of a private key used during said execution of said counter SCA algorithm.

2. The method of claim 1, wherein said precomputed vector is:

a precomputed multiplication vector M representing an operation sequence of modular exponentiations for Rivest Shamir Adleman (RSA), wherein M[r] represents indexing by r.

3. The method of claim 1, wherein said precomputed vector is:

a precomputed addition vector A representing an operation sequence of point additions for Elliptic Curve Cryptography (ECC), wherein A[r] represents indexing by r.

4. The method of claim 1, wherein said mixing is via non-overlapping windowing and includes:

looping through bits of said private key, D, according to a sliding window, wherein for each loop, an N-bit tuple from the private key is produced from the sliding window, wherein for each loop, the method comprises:

comparing a value of the N-bit tuple to the random number plus a linear increment and, if the value is a match, indexing into said precomputed vector according to said random number, r, thereby extracting and interleaving values into an execution path of said counter SCA algorithm from said precomputed vector according to an index represented by said random number; otherwise, if the value is not a match, executing said counter SCA algorithm as normal, thereby not interleaving precomputed values into the execution path of said counter SCA algorithm, wherein the sliding window of the looping proceeds in a direction of most significant bit (MSB) to least significant bit (LSB), or in a direction of LSB to MSB, for bits of said private key, D.

5. The method of claim 1, wherein said random number, r, is generated once during initialization steps prior to a looping, wherein said mixing the windowing process is performed on a bit-by-bit basis of the N-tuple, to provide a window bit-level mixing with said counter SCA algorithm.

6. The method of claim 1, wherein said random number, r, is generated during said lopping for each said loop, wherein said mixing the windowing process is performed on a bit-by-bit basis of the N-tuple, to provide a window bit-level mixing with said counter SCA algorithm.

7. The method of claim 2, wherein the windowing process for an RSA modular exponentiation is applied to a Square and Multiply always (SAMA) SCA algorithm adapted to interleave multiplication operators extracted from said precomputed multiplication vector during said RSA modular exponentiation.

8. The method of claim 1, wherein the windowing process for an ECC point multiplication is applied to a Double and Add always (DaAA) SCA algorithm adapted to interleave ECC addition operators extracted from a precomputed addition vector during said ECC point multiplication.

9. The method of claim 2, wherein the windowing process for RSA modular exponentiation is applied to an Atomic Square and Multiply (ATOMIC) Side Channel Attack (SCA) algorithm, and preserving a relationship between registers containing the operators for said operation such that randomization of the random number, r, ensures an operation sequence of the SCA algorithm using an M[r] from said precomputed multiplication vector is always different.

10. The method of claim 3, wherein the windowing process for ECC point multiplication is applied to an Atomic Square and Multiply (ATOMIC) Side Channel Attack (SCA) algorithm, and preserving a relationship between registers containing the operators for said operation such that randomization of the random number, r, ensures an operation sequence of the SCA algorithm using an A[r] from a precomputed addition vector is always different.

11. The method of claim 2, wherein the windowing process for RSA modular exponentiation is applied to a Montgomery Ladder (ML) SCA algorithm, and preserving a relationship between registers containing the operators for said operation such that randomization of the random number, r, ensures an operation sequence of the SCA algorithm using an M[r] from said precomputed multiplication vector is always different.

12. The method of claim 3, wherein the windowing process for ECC point multiplication is applied to a Montgomery Ladder (ML) SCA algorithm, and preserving a relationship between registers containing the operators for said operation such that randomization of the random number, r, ensures an operation sequence of the SCA algorithm using an A[r] from a precomputed addition vector is always different.

13. The method of claim 1, where the device is one among a processor, a crypto-processor, a smart-card, and a secure element, implementing counter SCA cryptographic algorithms.

14. The method of claim 1 mitigates timing attacks, power-monitoring attack, electromagnetic attack, Public Key cryptography (PKI) attacks, and differential power analysis attack.

15. A method for countering a profiling of deep-learning side channel (SCA) algorithm to disrupt a training phase of a deep-learning model by, altering an execution sequence of modular exponentiations or point additions in a counter SCA algorithm, characterized in that, by:

establishing a bit-length, N, of a non-overlapping sliding window, where N is the number of bits in the window;

generating a precomputation vector of precomuted modular exponentiations or point additions;

selecting a random number, r, using said bit-length, N;

looping through bits of a private key, D, that is subject of the SCA algorithm attack, according to said sliding window, wherein for each loop, an N-bit tuple from the private key is produced from the sliding window, wherein for each loop, the method comprises:

comparing a value of the N-bit tuple to the random number plus a linear increment and, if the value is a match, indexing into said precomputed vector according to said random number, r, thereby extracting and interleaving values into an execution path of said counter SCA algorithm from said precomputed vector according to an index represented by said random number; otherwise, if the value is not a match, executing said counter SCA algorithm as normal, thereby not interleaving precomputed values into the execution path of said counter SCA algorithm, wherein the sliding window of the looping proceeds in a direction of most significant bit (MSB) to least significant bit (LSB), or in a direction of LSB to MSB, for bits of said private key, D, whereby the randomizing preemptively introduces future faults in a deep-learning labeling process of operation sequences to bit values, wherein values selected from said precomputed vector are interleaved into said counter SCA algorithm according to the random number, r.

* * * * *